US012775794B2

(12) United States Patent
Watanabe et al.

(10) Patent No.: US 12,775,794 B2
(45) Date of Patent: Oct. 27, 2026

(54) GENERATING A PERSONAL CORPUS

(71) Applicant: International Business Machines Corporation, Armonk, NY (US)

(72) Inventors: Kenta Watanabe, Soka (JP); Takahito Tashiro, Mitaka (JP); Takashi Fukuda, Tokyo (JP); Taihei Miyamoto, Nakano (JP)

(73) Assignee: International Business Machines Corporation, Armonk, NY (US)

( * ) Notice: Subject to any disclaimer, the term of this patent is extended or adjusted under 35 U.S.C. 154(b) by 353 days.

(21) Appl. No.: 17/936,874

(22) Filed: Sep. 30, 2022

(65) Prior Publication Data

US 2024/0111951 A1 Apr. 4, 2024

(51) Int. Cl.

| | |
|---|---|
| ***G06F 40/268*** | (2020.01) |
| ***G06F 16/35*** | (2025.01) |
| ***G06F 40/284*** | (2020.01) |
| ***G06F 40/30*** | (2020.01) |
| ***G06F 40/49*** | (2020.01) |

(52) U.S. Cl.

CPC ............ *G06F 40/268* (2020.01); *G06F 16/35* (2019.01); *G06F 40/284* (2020.01); *G06F 40/30* (2020.01); *G06F 40/49* (2020.01)

(58) Field of Classification Search

CPC ...... G06F 40/268; G06F 16/35; G06F 40/284; G06F 40/30; G06F 40/49

See application file for complete search history.

(56) References Cited

U.S. PATENT DOCUMENTS

| | | | | |
|---|---|---|---|---|
| 9,037,464 | B1 * | 5/2015 | Mikolov | G10L 15/06 704/255 |
| 9,208,144 | B1 * | 12/2015 | Abdulnasyrov | G06F 40/42 |
| 10,169,322 | B2 * | 1/2019 | Liu | G06F 40/242 |
| 10,372,818 | B2 * | 8/2019 | Bute | G06F 40/274 |
| 10,846,319 | B2 * | 11/2020 | Lin | G06F 16/3338 |
| 11,461,822 | B2 * | 10/2022 | Wadhwa | G06Q 30/0282 |
| 2016/0078039 | A1 | 3/2016 | Baughman | |
| 2019/0005138 | A1 | 1/2019 | Andreica | |
| 2019/0164066 | A1 | 5/2019 | Beller | |

(Continued)

OTHER PUBLICATIONS

Yao, Jing, Zhicheng Dou, and Ji-Rong Wen, "Clarifying Ambiguous Keywords with Personal Word Embeddings for Personalized Search", Nov. 2021, ACM Transactions on Information Systems (TOIS), vol. 40, No. 3, Article 43, pp. 1-29. (Year: 2021).*

(Continued)

*Primary Examiner* — James Boggs
(74) *Attorney, Agent, or Firm* — Andre L. Adkins

(57) ABSTRACT

In an approach for generating a user-specific personal corpus, a processor creates a basic corpus for a first user using a first set of data sources, wherein the basic corpus includes one or more basic words and one or more vectors of the one or more basic words. A processor extracts a set of text from a second set of data sources associated with the first user. Responsive to finding an unknown word included in the set of text extracted, a processor updates the basic corpus, wherein the basic corpus is updated by replacing a vector of the unknown word with an average vector of the one or more basic words in the basic corpus created and registering the unknown word in a first personal corpus.

17 Claims, 17 Drawing Sheets

(56) References Cited

U.S. PATENT DOCUMENTS

2023/0083959 A1* 3/2023 Kosaka .................. G06V 30/40
706/12

OTHER PUBLICATIONS

Soper, Elizabeth, and Jean-Pierre Koenig, "When Polysemy Matters: Modeling Semantic Categorization with Word Embeddings", Jul. 2022, Proceedings of the 11th Joint Conference on Lexical and Computational Semantics, pp. 123-131. (Year: 2022).*

Huang, Eric H., Richard Socher, Christopher D. Manning, and Andrew Y. Ng, "Improving Word Representations via Global Context and Multiple Word Prototypes", Jul. 2012, Proceedings of the 50th Annual Meeting of the Association for Computational Linguistics, pp. 873-882. (Year: 2012).*

Authors et al.: Disclosed Anonymously, "Contextual Abbreviation and Emoji Translator", An IP.com Prior Art Database Technical Disclosure, IP.com No. IPCOM000261254D, IP.com Electronic Publication Date: Feb. 13, 2020, 5 Pages.

* cited by examiner $$V_{KW} = AVE(V_{BW}, V_{KW})$$

300J

EXPRESSION USING VECTORS (1, 0, 1, . . . , 1, 2)

FREQUENCY *f* is_general_word

EXPRESSION USING RDB

| ID | WORD | VECTOR | is_general_word | FREQUENCY | SYNONYM ID | CATEGORY |
|---|---|---|---|---|---|---|
| 1 | DI | (1, 0, 1, . . . ) | 1 | 1 | | IT |
| 2 | DI | (0, 0, 1, . . . ) | 2 | 2 | 3 | ECONOMY |
| 3 | DIFFUSION INDEX | (0, 0, 1, . . . ) | 1 | 1 | 2 | ECONOMY |

FIG. 3J

GENERATING A PERSONAL CORPUS

BACKGROUND OF THE INVENTION

The present invention relates generally to the field of data processing, and more particularly to generating a personal corpus, which consists of a knowledge of individual summaries of an invention and conventional technology.

SUMMARY

Aspects of an embodiment of the present invention disclose a method, computer program product, and computer system for generating a user-specific personal corpus. A processor creates a basic corpus for a first user using a first set of data sources, wherein the basic corpus includes one or more basic words and one or more vectors of the one or more basic words. A processor extracts a set of text from a second set of data sources associated with the first user. Responsive to finding an unknown word included in the set of text extracted, a processor updates the basic corpus, wherein the basic corpus is updated by replacing a vector of the unknown word with an average vector of the one or more basic words in the basic corpus created and registering the unknown word in a first personal corpus.

In some aspects of an embodiment of the present invention, a processor tags each basic word of the one or more basic words with a flag.

In some aspects of an embodiment of the present invention, a processor separates a first basic word from the basic corpus if the basic word is polysemous. A processor clusters the first basic word with a second basic word based on a degree of similarity.

In some aspects of an embodiment of the present invention, the second set of data sources includes at least one of a group of historical information acquired from a user computing device of the first user and a group of information input into the user computing device by the first user.

In some aspects of an embodiment of the present invention, the group of historical information acquired from the user computing device of the first user and the group of information input into the user computing device by the first user includes at least one of a web browsing history of the user computing device, an email history of the user computing device, a chat history of the user computing device, and a text message history of the user computing device.

In some aspects of an embodiment of the present invention, a processor divides the set of text into one or more words using morphological analysis. A processor creates a first word group from the set of text.

In some aspects of an embodiment of the present invention, subsequent to extracting the set of text from the second set of data sources associated with the first user, a processor processes the unknown word from the first word group created. A processor processes a known word from the first word group created.

In some aspects of an embodiment of the present invention, a processor extracts a third basic word from the first word group created. A processor classifies the third basic word into a basic word group. A processor calculates the average vector for the basic word group.

In some aspects of an embodiment of the present invention, responsive to finding the known word included in the set of text extracted, a processor determines a distance between a vector of the known word and the average vector for the basic word group. Responsive to determining the distance does exceed a first threshold, a processor registers the known word in the first personal corpus as a polysemous word. Responsive to determining the distance does not exceed the first threshold, a processor updates the vector of the known word by replacing the vector of the known word with an average of the vector of the known word and the average vector for the basic word group.

In some aspects of an embodiment of the present invention, a processor obtains a plurality of unique words other than the basic words from the second set of data sources associated with the first user. A processor determines among the plurality of unique words, one or more common words are included in a second personal corpus of the second user. A processor extracts a second word group and a third word group having a vector close to a common word of the one or more common words included in the first personal corpus of the first user and the second personal corpus of the second user, respectively. Responsive to the similarity between the second word group and the third word group not exceeding a second threshold, a processor sends a notification to the first user, or a processor sends a word that has the vector close to the common word and is selected from the first word group to the second user together with a set of textual information.

These and other features and advantages of the present invention will be described in, or will become apparent to those of ordinary skill in the art in view of, the following detailed description of the example embodiments of the present invention.

BRIEF DESCRIPTION OF THE DRAWINGS

FIG. 3J is an exemplary diagram illustrating a relational database, on the server within the distributed data processing environment of FIG. 1, in accordance with an embodiment of the present invention;

DETAILED DESCRIPTION

Embodiments of the present invention recognize that an individual word or phrase can be used (in different contexts) to express two or more different meanings. This is referred to as polysemy. Polysemy is distinguished from simple homonyms (i.e., where words sound alike but have different meanings) by etymology. For example, the word dish is a polysemous word. Dish may mean a kind of plate (e.g., "It is your turn to wash the dishes."). Dish may also mean a meal (e.g., "How long does it take to cook this dish?").

Embodiments of the present invention recognize that polysemous words may create communication issues between two or more communicating parties. For example, an issue may arise when a word has multiple meanings and the meaning of the word differs among the two or more communicating parties. This is true even when the same word is included in the corpora of the two or more communicating parties. Therefore, embodiments of the present invention recognize the need for a system and method to compare the personal corpora of the two or more communicating parties and to detect any differences in the meaning of a word between the two or more communicating parties.

Embodiments of the present invention provide a system and method to generate a user-specific personal corpus. Embodiments of the present invention provide a system and method to perform a comparison between each personal corpus of the two or more communicating parties to detect for differences in the meaning of a word contained in each personal corpus. A personal corpus is a personal database of a set of words that a user knows. Each personal corpus can be built from various sources of information including, but not limited to, a web browsing history, an email history, a chat history, and a text message history. Embodiments of the present invention detect differences in the meaning of a word by selecting the words close to the subject word used in the conversation, from a vector-based corpus, and by determining the similarity of the selected words between parties. Embodiments of the present invention send a notification to either or both of the two or more communicating parties if the similarity of the vectors of the word in the communicating party's personal corpus falls below a threshold, indicating a word may have a different meaning. Embodiments of the present invention update each personal corpus by replacing the vector of an unknown word that is included in the extracted word group but not included in a basic corpus, with the average vector of the basic words included in the basic corpus, and adding the unknown word to each personal corpus.

Implementation of embodiments of the present invention may take a variety of forms, and exemplary implementation details are discussed subsequently with reference to the Figures.

Figure 1:
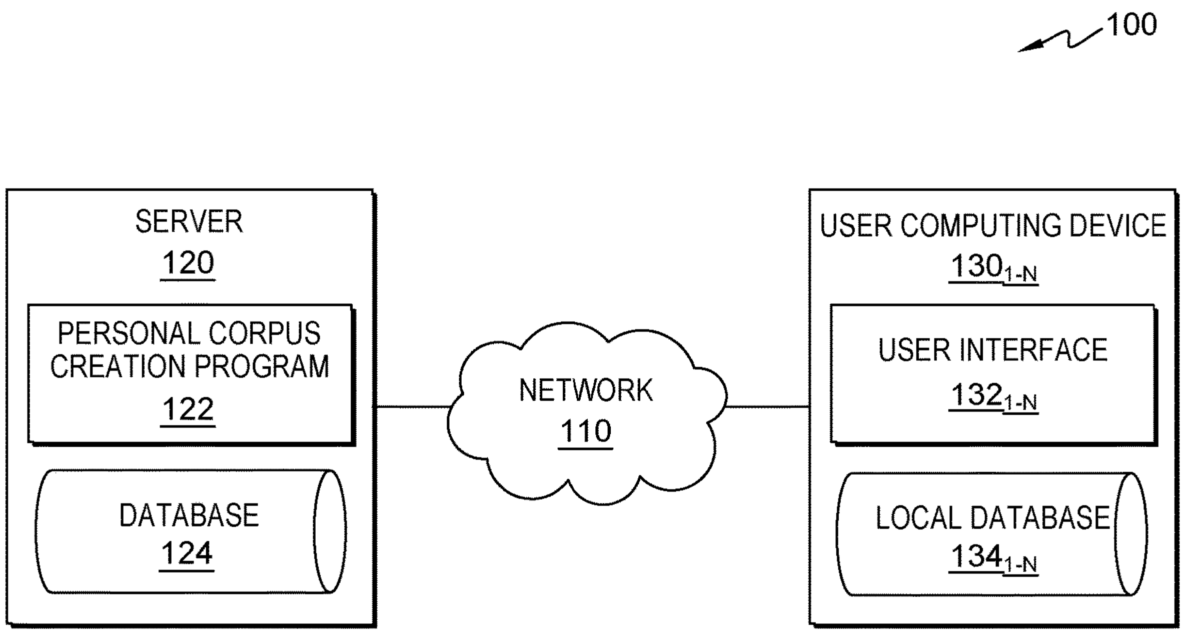
FIG. 1 is a block diagram illustrating a distributed data processing environment, in accordance with an embodiment of the present invention.

FIG. 1 is a block diagram illustrating a distributed data processing environment, generally designated 100, in accordance with an embodiment of the present invention. In the depicted embodiment, distributed data processing environment 100 includes server 120 and user computing devices $\mathbf{130}_{1\text{-}N}$, interconnected over network 110. Distributed data processing environment 100 may include additional servers, computers, computing devices, and other devices not shown. The term "distributed" as used herein describes a computer system that includes multiple, physically distinct devices that operate together as a single computer system. FIG. 1 provides only an illustration of one embodiment of the present invention and does not imply any limitations with regards to the environments in which different embodiments may be implemented. Many modifications to the depicted environment may be made by those skilled in the art without departing from the scope of the invention as recited by the claims.

Network 110 operates as a computing network that can be, for example, a telecommunications network, a local area network (LAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include data, voice, and video information. In general, network 110 can be any combination of connections and protocols that will support communications between server 120, user computing devices $\mathbf{130}_{1\text{-}N}$, and other computing devices (not shown) within distributed data processing environment 100.

Server 120 operates to run personal corpus creation program 122 and to send and/or store data in database 124. In an embodiment, server 120 can send data from database 124 to user computing devices $\mathbf{130}_{1\text{-}N}$. In an embodiment, server 120 can receive data in database 124 from user computing devices $\mathbf{130}_{1\text{-}N}$. In one or more embodiments, server 120 can be a standalone computing device, a management server, a web server, a mobile computing device, or any other electronic device or computing system capable of receiving, sending, and processing data and capable of communicating with user computing devices $130_{1-N}$ via network 110. In one or more embodiments, server 120 can be a computing system utilizing clustered computers and components (e.g., database server computers, application server computers, etc.) that act as a single pool of seamless resources when accessed within distributed data processing environment 100, such as in a cloud computing environment. In one or more embodiments, server 120 can be a laptop computer, a tablet computer, a netbook computer, a personal computer, a desktop computer, a personal digital assistant, a smart phone, or any programmable electronic device capable of communicating with user computing devices $130_{1-N}$ and other computing devices (not shown) within distributed data processing environment 100 via network 110. Server 120 may include internal and external hardware components, as depicted and described in further detail in FIG. 4.

Personal corpus creation program 122 operates to generate a user-specific personal corpus. In the depicted embodiment, personal corpus creation program 122 is a standalone program. In another embodiment, personal corpus creation program 122 may be integrated into another software product, such as a communication software (i.e., an application designed to share information from one system to another, e.g., an application used for such tasks as file transfers or an application used for such tasks as instant messaging and video conferencing). In the depicted embodiment, personal corpus creation program 122 resides on server 120. In another embodiment, personal corpus creation program 122 may reside on user computing devices $130_{1-N}$ or on another computing device (not shown), provided that personal corpus creation program 122 has access to network 110. The operational steps of personal corpus creation program 122 are depicted and described in further detail with respect to FIG. 2. A creation of a basic corpus C is depicted and described in further detail with respect to FIG. 3A. A processing of an unknown word of a word group W is depicted and described in further detail with respect to FIG. 3B and FIG. 3C. A processing of a known word of the word group W is depicted and described in further detail with respect to FIG. 3D and FIG. 3E. A processing of a polysemous word of the word group W is depicted and described in further detail with respect to FIG. 3F and FIG. 3G. An update of a frequency f of the polysemous word selected among the polysemous words of the word group W is depicted and described in further detail with respect to FIG. 3H and FIG. 3I. A relational database is depicted and described in further detail with respect to FIG. 3J. A first application of personal corpus creation program 122 is depicted and described in further detail with respect to FIG. 3K and FIG. 3L. A second application of personal corpus creation program 122 is depicted and described in further detail with respect to FIG. 3M and FIG. 3N.

In an embodiment, a user of user computing devices $130_{1-N}$ registers with personal corpus creation program 122 of server 120. For example, the user completes a registration process (e.g., user validation), provides information to create a user profile, and authorizes the collection, analysis, and distribution (i.e., opts-in) of relevant data on identified computing devices (e.g., on user computing devices $130_{1-N}$) by server 120 (e.g., via personal corpus creation program 122). Relevant data includes, but is not limited to, personal information or data provided by the user or inadvertently provided by the user's device without the user's knowledge; tagged and/or recorded location information of the user (e.g., to infer context (i.e., time, place, and usage) of a location or existence); time stamped temporal information (e.g., to infer contextual reference points); and specifications pertaining to the software or hardware of the user's device. In an embodiment, the user opts-in or opts-out of certain categories of data collection. For example, the user can opt-in to provide all requested information, a subset of requested information, or no information. In one example scenario, the user opts-in to provide time-based information, but opts-out of providing location-based information (on all or a subset of computing devices associated with the user). In an embodiment, the user opts-in or opts-out of certain categories of data analysis. In an embodiment, the user opts-in or opts-out of certain categories of data distribution. Such preferences can be stored in database 124.

Database 124 operates as a repository for data received, used, and/or generated by personal corpus creation program 122. A database is an organized collection of data. Data includes, but is not limited to, information about user preferences (e.g., general user system settings such as alert notifications for user computing devices $130_{1-N}$); information about alert notification preferences; a user-specific profile; a user-specific corpus C; and any other data received, used, and/or generated by personal corpus creation program 122.

Database 124 can be implemented with any type of device capable of storing data and configuration files that can be accessed and utilized by server 120, such as a hard disk drive, a database server, or a flash memory. In an embodiment, database 124 is accessed by personal corpus creation program 122 to store and/or to access the data. In the depicted embodiment, database 124 resides on server 120. In another embodiment, database 124 may reside on another computing device, server, cloud server, or spread across multiple devices elsewhere (not shown) within distributed data processing environment 100, provided that personal corpus creation program 122 has access to database 124.

The present invention may contain various accessible data sources, such as database 124, that may include personal and/or confidential company data, content, or information the user wishes not to be processed. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal and/or confidential company data. Personal corpus creation program 122 enables the authorized and secure processing of personal data.

Personal corpus creation program 122 provides informed consent, with notice of the collection of personal and/or confidential data, allowing the user to opt-in or opt-out of processing personal and/or confidential data. Consent can take several forms. Opt-in consent can impose on the user to take an affirmative action before personal and/or confidential data is processed. Alternatively, opt-out consent can impose on the user to take an affirmative action to prevent the processing of personal and/or confidential data before personal and/or confidential data is processed. Personal corpus creation program 122 provides information regarding personal and/or confidential data and the nature (e.g., type, scope, purpose, duration, etc.) of the processing. Personal corpus creation program 122 provides the user with copies of stored personal and/or confidential company data. Personal corpus creation program 122 allows the correction or completion of incorrect or incomplete personal and/or confidential data. Personal corpus creation program 122 allows for the immediate deletion of personal and/or confidential data.

User computing devices $\mathbf{130}_{1\text{-}N}$ operates to each run user interfaces $\mathbf{132}_{1\text{-}N}$, respectively, through which a user can interact with personal corpus creation program 122 on server 120 and to store data in and/or send data from local databases $\mathbf{134}_{1\text{-}N}$. As used herein, N represents a positive integer, and accordingly the number of scenarios implemented in a given embodiment of the present invention is not limited to those depicted in FIG. 1. In an embodiment, user computing devices $\mathbf{130}_{1\text{-}N}$ are each a device that performs programmable instructions. For example, user computing devices $\mathbf{130}_{1\text{-}N}$ may each be an electronic device, such as a laptop computer, a tablet computer, a netbook computer, a personal computer, a desktop computer, a smart phone, or any programmable electronic device capable of running the respective user interfaces $\mathbf{132}_{1\text{-}N}$ and of communicating (i.e., sending and receiving data) with personal corpus creation program 122 via network 110. In general, user computing devices $\mathbf{130}_{1\text{-}N}$ represents any programmable electronic device or a combination of programmable electronic devices capable of executing machine readable program instructions and communicating with other computing devices (not shown) within distributed data processing environment 100 via network 110. In the depicted embodiment, user computing devices $\mathbf{130}_{1\text{-}N}$ each include an instance of user interfaces $\mathbf{132}_{1\text{-}N}$ and local databases $\mathbf{134}_{1\text{-}N}$.

User interfaces $\mathbf{132}_{1\text{-}N}$ operate as a local user interface between personal corpus creation program 122 on server 120 and a user of user computing devices $\mathbf{130}_{1\text{-}N}$. In some embodiments, user interface $\mathbf{132}_{1\text{-}N}$ are a graphical user interface (GUI), a web user interface (WUI), and/or a voice user interface (VUI) that can display (i.e., visually) or present (i.e., audibly) text, documents, web browser windows, user options, application interfaces, and instructions for operations sent from personal corpus creation program 122 to a user via network 110. User interfaces $\mathbf{132}_{1\text{-}N}$ can also display or present alerts including information (such as graphics, text, and/or sound) sent from personal corpus creation program 122 to a user via network 110. In an embodiment, user interfaces $\mathbf{132}_{1\text{-}N}$ are capable of sending and receiving data (i.e., to and from personal corpus creation program 122 via network 110, respectively). Through user interfaces $\mathbf{132}_{1\text{-}N}$, a user can opt-in to personal corpus creation program 122; create a user profile; set user preferences and alert notification preferences; utilize web browsing, email, chat, and text messaging; receive alert notifications; receive a request for feedback; and input feedback.

A user preference is a setting that can be customized for a particular user. A set of default user preferences are assigned to each user of personal corpus creation program 122. A user preference editor can be used to update values to change the default user preferences. User preferences that can be customized include, but are not limited to, general user system settings, specific user profile settings, alert notification settings, and machine-learned data collection/storage settings. Machine-learned data is a user's personalized corpus of data. Machine-learned data includes, but is not limited to, past results of iterations of personal corpus creation program 122.

Local databases $\mathbf{134}_{1\text{-}N}$ operate as a repository for a user-specific profile and corpus C. Local databases $\mathbf{134}_{1\text{-}N}$ can be implemented with any type of device capable of storing data and configuration files that can be accessed and utilized by server 120, such as a hard disk drive, a database server, or a flash memory. In an embodiment, local databases $\mathbf{134}_{1\text{-}N}$ are each accessed by personal corpus creation program 122 to store and/or to access the data. In the depicted embodiment, local databases $\mathbf{134}_{1\text{-}N}$ reside on respective user computing devices $\mathbf{130}_{1\text{-}N}$. In another embodiment, local databases $\mathbf{134}_{1\text{-}N}$ may reside on another computing device, server, cloud server, or spread across multiple devices elsewhere (not shown) within distributed data processing environment 100, provided that personal corpus creation program 122 has access to local databases $\mathbf{134}_{1\text{-}N}$.

Figure 2:
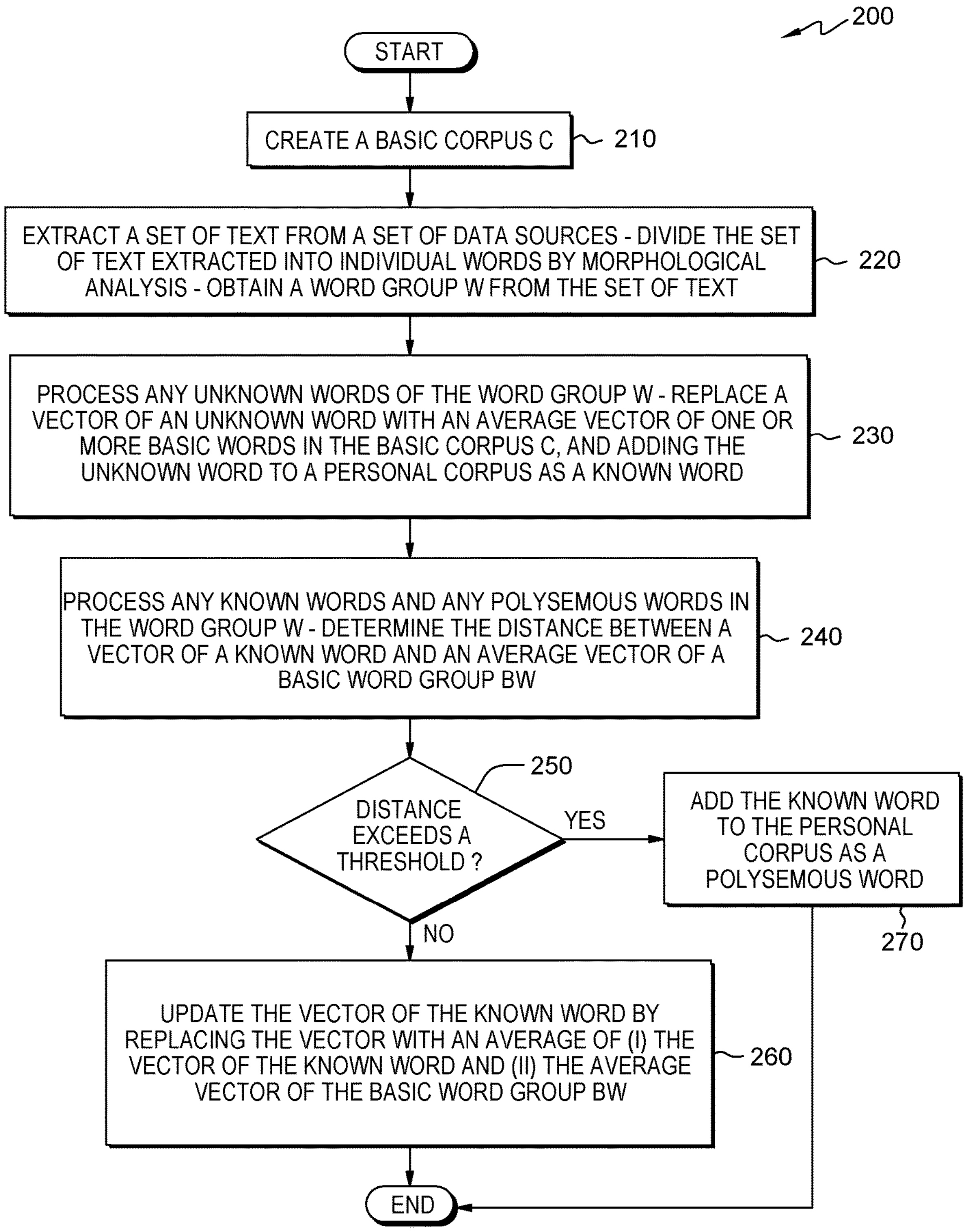
FIG. 2 is a flowchart illustrating the operational steps of a personal corpus creation program, on a server within the distributed data processing environment of FIG. 1, in accordance with an embodiment of the present invention.

FIG. 2 is a flowchart, generally designated 200, illustrating the operational steps for personal corpus creation program 122 in distributed data processing environment 100 of FIG. 1, in accordance with an embodiment of the present invention. In an embodiment, personal corpus creation program 122 operates to generate a user-specific personal corpus. It should be appreciated that the process depicted in FIG. 2 illustrates one possible iteration of personal corpus creation program 122, which may be repeated after each communication involving a user for whom the corpus is created.

In 210, personal corpus creation program 122 creates a basic corpus C for a first user. In an embodiment, personal corpus creation program 122 creates a basic corpus C using a first set of data sources. The first set of data sources may include, but are not limited to, sources which consists of only common terms (e.g., Wikipedia®). The basic corpus C may include, but is not limited to, one or more basic words and one or more vectors of the one or more basic words.

In an embodiment, personal corpus creation program 122 tags each basic word in the basic corpus C with a flag. The flag denotes each basic word as "is_general_word=true".

In an embodiment, if the basic corpus C contains a basic word that is polysemous (i.e., the basic word can be used in different contexts to express two or more different meanings), then personal corpus creation program 122 separates the basic word from the basic corpus C (i.e., as a separate entry or as a separate vector). In an embodiment, personal corpus creation program 122 clusters the vectors of the basic words separated from the basic corpus C based on a degree of similarity (i.e., between the basic words separated from the basic corpus C). In an embodiment, personal corpus creation program 122 clusters the vectors of the basic words separated from the basic corpus C using one or more existing techniques known in the art. The one or more existing techniques known in the art may include, but is not limited to, Word2Vec. Clustering of the vectors of the basic words separated from the basic corpus C is optional and may or may not be performed by personal corpus creation program 122.

In step 220, responsive to the first user (via user computing device $\mathbf{130}_1$) preparing a communication to a second user (via user computing device $\mathbf{130}_N$), personal corpus creation program 122 extracts a set of text X from the communication. In another embodiment, personal corpus creation program 122 extracts a set of text X from a second set of data sources. The second set of data sources may include, but are not limited to, a group of historical information that the first user acquires from the first user computing device (e.g., user computing device $\mathbf{130}_1$) and a group of information that the first user inputs into the first user computing device (e.g., user computing device $\mathbf{130}_1$). The information may include, but is not limited to, a web browsing history (i.e., a list of web pages the first user has visited as well as associated metadata such as a page title and a time of visit), an email history (e.g., a list of emails sent and a list of emails received), chat history (e.g., a list of chat messages sent and a list of chat messages received), text message history (e.g., a list of written and/or voice text messages sent (including text messages written by the first user) and a list of written and/or voice text messages received (including text messages read by the first user)), and a set of text the first user read when using a Head-Mounted Display.

In an embodiment, personal corpus creation program 122 divides the set of text X into individual words using morphological analysis. In an embodiment, personal corpus creation program 122 creates a word group W from the set of text X extracted from an entire page. In another embodiment, personal corpus creation program 122 creates a word group W from the set of text X extracted from a pre-defined window size.

In step 230, personal corpus creation program 122 processes any unknown words from word group W. In an embodiment, personal corpus creation program 122 processes any unknown words from word group W by extracting any basic words from word group W. In an embodiment, personal corpus creation program 122 extracts any basic words from word group W. Basic words are flagged as "is_general_word=true". In an embodiment, if a basic word extracted is stored in basic corpus C (i.e., a known word), personal corpus creation program 122 classifies the basic word extracted into a basic word group BW. In an embodiment, if a basic word extracted is not stored in basic corpus C (i.e., an unknown word), personal corpus creation program 122 classifies the basic word extracted into an unknown word group NW.

In an embodiment, personal corpus creation program 122 obtains a vector for each basic word in basic word group BW. In an embodiment, personal corpus creation program 122 calculates the average vector $V_{BW}$ (i.e., for all of the basic words in basic word group BW). In an embodiment, personal corpus creation program 122 saves the average vector $V_{BW}$ as a vector of unknown words $n \in NW$. If there is more than one basic word in basic word group BW, the vector for all of the unknown words in basic word group BW is the same (i.e., $n \in NW$). To avoid this, the average vector $V_{BW}$ may be multiplied by a random number for each unknown word to fine-tune the vector.

In an embodiment, personal corpus creation program 122 replaces the vector for each basic word extracted but not stored in basic corpus C (i.e., an unknown word) with the average vector $V_{BW}$. In an embodiment, personal corpus creation program 122 registers each basic word extracted but not stored in basic corpus C (i.e., an unknown word) in the basic corpus C. By registering the basic words extracted but not stored in basic corpus C (i.e., an unknown word) in basic corpus C, the basic words become known words. Additionally, by registering the basic words extracted but not stored in basic corpus C (i.e., unknown words) to basic corpus C, basic corpus C becomes a personal corpus (i.e., a corpus personal to the first user).

In an embodiment, personal corpus creation program 122 sends an alert notification to the first user (via user computing device 130$_1$). In an embodiment, personal corpus creation program 122 sends an alert notification to the first user, notifying the first user of the unknown word. In another embodiment, personal corpus creation program 122 sends an alert notification to the second user (via user computing device 130$_N$), notifying the second user of the unknown word (i.e., to teach the second user the meaning of the unknown word).

In step 240, personal corpus creation program 122 processes any known words and any polysemous word in word group W. A known word is a non-basic word stored in basic corpus C. A non-basic word is flagged as "is_general_word=false". A group of known words are treated as a known word group KW. A known word is also a word that was not originally included in basic corpus C, but later added to basic corpus C. A polysemous word is identified by determining whether the word is included in a circle (i.e., an ellipse) encompassing a cluster of words. In an embodiment, personal corpus creation program 122 processes any known words and any polysemous words in word group W by determining the distance between the existing $V_{KW}$, which is the vector of the known word k stored in corpus C, and $V_{BW}$, which is the average vector of the basic word group BW.

In decision step 250, personal corpus creation program 122 determines whether the distance between the existing $V_{KW}$ and $V_{BW}$ exceeds a predetermined threshold $T_D$. If personal corpus creation program 122 determines the distance between the existing $V_{KW}$ and $V_{BW}$ does not exceed a predetermined threshold $T_D$ (decision step 250, NO branch), then personal corpus creation program 122 proceeds to step 260, updates the vector of a known word in word group W. If personal corpus creation program 122 determines the distance between the existing $V_{KW}$ and $V_{BW}$ does exceed a predetermined threshold $T_D$ (decision step 250, YES branch), then personal corpus creation program 122 proceeds to step 270, adding a known word to the personal corpus.

In step 260, responsive to determining the distance between the existing $V_{KW}$ and $V_{BW}$ does not exceed the predetermined threshold $T_D$, personal corpus creation program 122 updates the vector of a known word (i.e., $k \in KW$) in word group W. In an embodiment, personal corpus creation program 122 updates the vector of a known word in word group W with $V_{KW}$ In an embodiment, personal corpus creation program 122 updates the vector of a known word in word group W by replacing the vector with an average of the existing $V_{KW}$, which is the vector of a known word k stored in corpus C and $V_{BW}$, which is the average vector of the basic word group BW.

In an embodiment, personal corpus creation program 122 sends an alert notification to the first user (via user computing device 130$_1$). In an embodiment, personal corpus creation program 122 sends an alert notification to the first user, notifying the first user of the difference in perception of the known word.

In step 270, responsive to determining the distance between the existing $V_{KW}$ and $V_{BW}$ does exceed the predetermined threshold $T_D$, personal corpus creation program 122 registers the known word in the personal corpus. In an embodiment, if there is more than one polysemous word, personal corpus creation program 122 subjects the closest polysemous word of the more than one polysemous word to the calculation (i.e., determining whether the distance between the existing $V_{KW}$ and $V_{BW}$ exceeds the predetermined threshold $T_D$). In an embodiment, personal corpus creation program 122 selects a polysemous word.

In an embodiment, personal corpus creation program 122 updates the frequency f of the word selected among the polysemous words. The frequency f is a parameter representing priority among polysemous words. The frequency f may be the sum of the number of times the word is used (i.e., in word group W), or a separate formula may be created to allow an administrator to optimize it. The user's occupation and other information regarding the user may be used as a reference when calculating the frequency f (and proficiency) of a word. For example, Information Technology engineers may use DI to indicate Dependency Injection. The frequency f (and proficiency) of DI (indicating Dependency Injection) is set to be greater than DI (indicating Diffusion Index). Generally, the higher the frequency f, the more frequently the word is used and/or seen by the user. In an embodiment, personal corpus creation program 122 stores the frequency f of a word in a database (e.g., database 124). In another embodiment, personal corpus creation program 122 stores the frequency f of a word as fields in a relational database (RDB). A RDB is a collective set of multiple data sets organized by tables, records, and columns. In another embodiment, personal corpus creation program 122 uses the frequency f of a word as one of the components of a vector.

In another embodiment, personal corpus creation program 122 updates the proficiency p of the word selected among polysemous words. For example, it is assumed that a person understands a word better if he or she has used (e.g., written) the word than if he or she has only read it. In an embodiment, personal corpus creation program 122 stores the number of times the word has been read and the number of times the word has been written with the vector in a database (e.g., database 124). In an embodiment, personal corpus creation program 122 calculates the proficiency p using the following equation: $p=c_{read}*RP+c_{write}*WP$, wherein c read is the number of times the word has been read and c write is the number of times the word has been written, and wherein RP and WP are predetermined constants, where RP<WP.

In an embodiment, personal corpus creation program 122 sends an alert notification to the first user (via user computing device $\mathbf{130}_1$). In an embodiment, personal corpus creation program 122 sends an alert notification to the first user, notifying the first user of the difference in perception of the polysemous word.

Figure 3A:
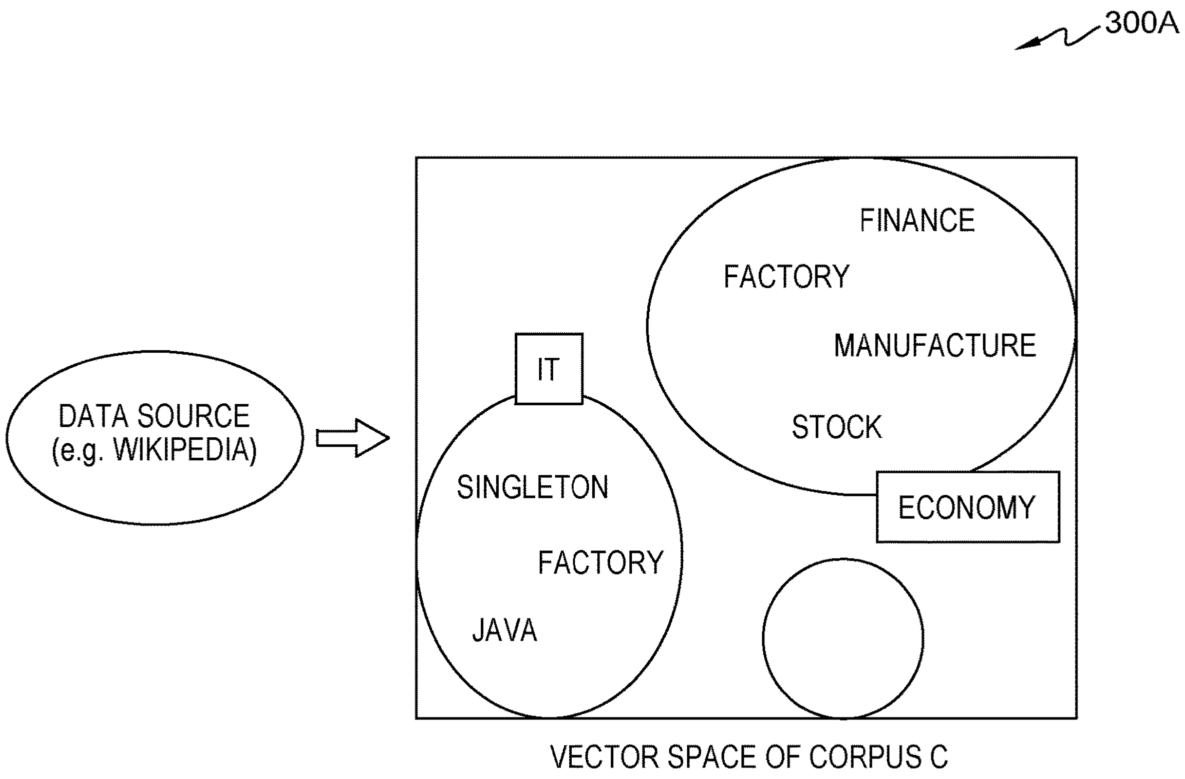
FIG. 3A is an exemplary diagram illustrating a creation of a basic corpus C, on the server within the distributed data processing environment of FIG. 1, in accordance with an embodiment of the present invention.

FIG. 3A is an exemplary diagram, generally designated 300A, illustrating a creation of a basic corpus C, on server 120 within distributed data processing environment 100 of FIG. 1, in accordance with an embodiment of the present invention. Personal corpus creation program 122 creates a basic corpus C from a data source (e.g., Wikipedia®). The following basic words were extracted from the data source and added to the basic corpus C: singleton, factory, java, finance, manufacture, and stock. Personal corpus creation program 122 separates the basic words (i.e., as vectors). Personal corpus creation program 122 clusters the vectors based on similarities and creates two clusters: an IT cluster and an Economy cluster.

Figure 3B:
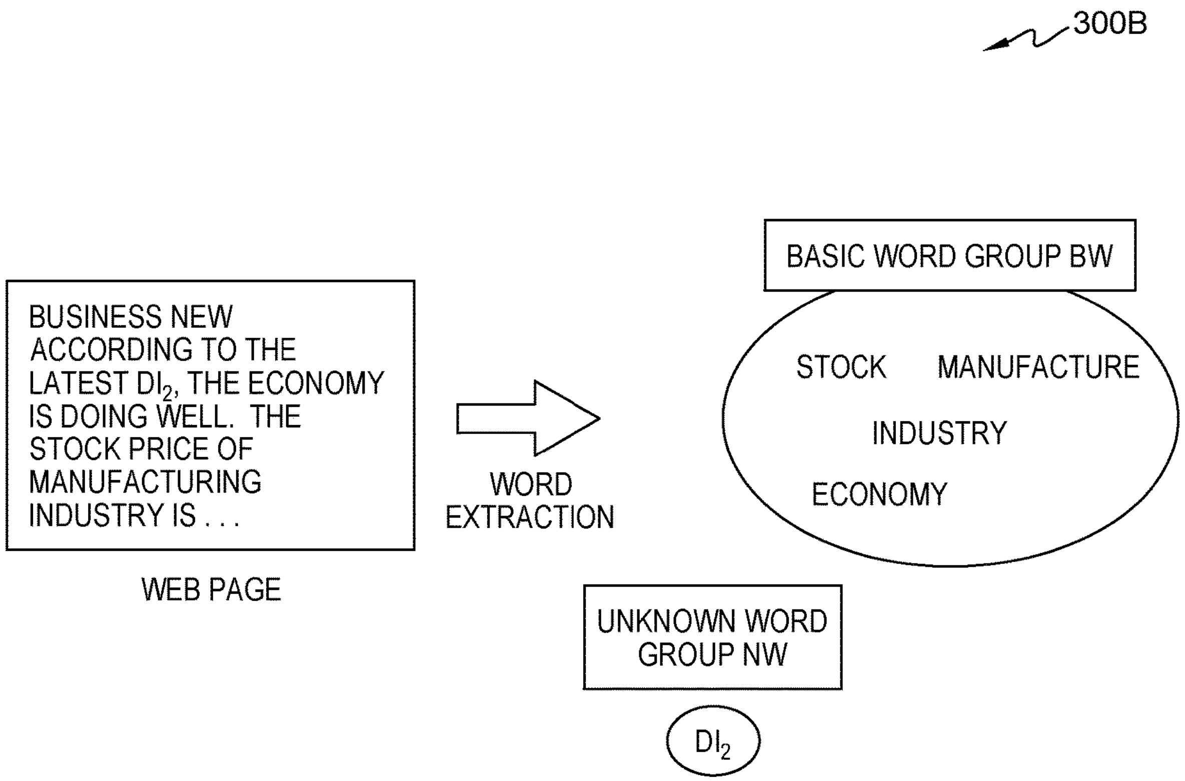
FIG. 3B is an exemplary diagram illustrating a processing of an unknown word of a word group W, on the server within the distributed data processing environment of FIG. 1, in accordance with an embodiment of the present invention.
Figure 3C:
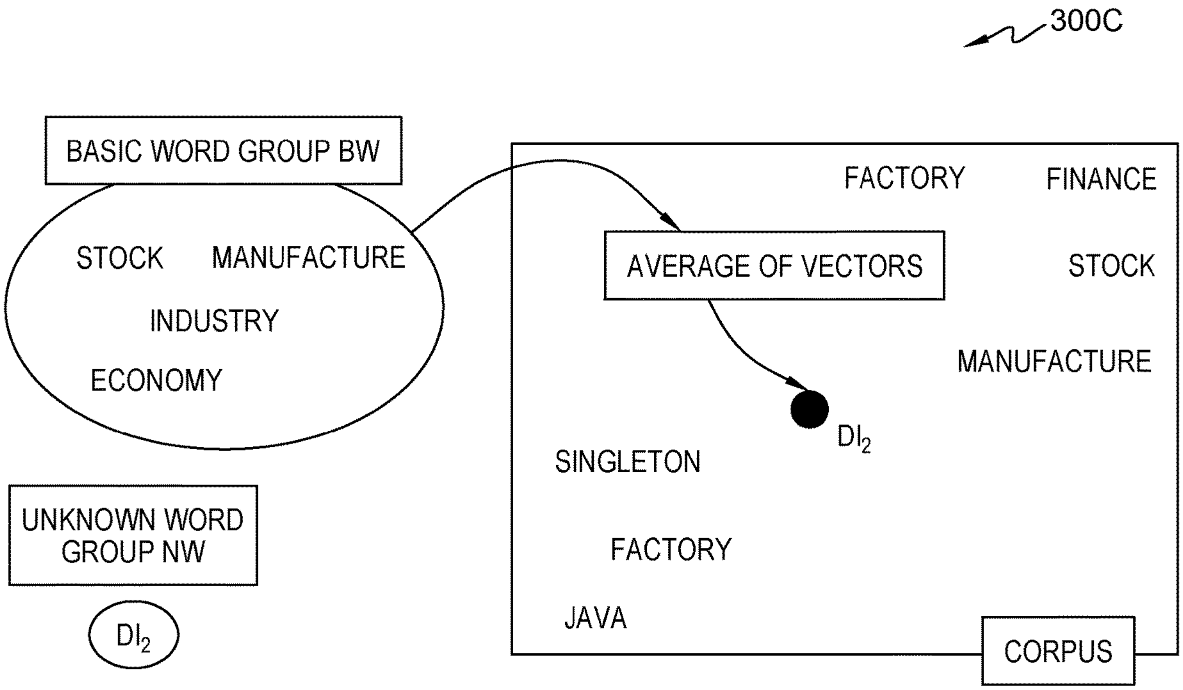
FIG. 3C is an exemplary diagram illustrating the processing of the unknown word of the word group W, on the server within the distributed data processing environment of FIG. 1, in accordance with an embodiment of the present invention.

FIG. 3B and FIG. 3C are exemplary diagrams, generally designated 300B and 300C, respectively, illustrating a processing of an unknown word of a word group W, on server 120 within distributed data processing environment 100 of FIG. 1, in accordance with an embodiment of the present invention. Personal corpus creation program 122 extracts a set of text X from a web page. The set of text X extracted states, "According to the latest ($DI_2$), the economy is doing well. The stock price of manufacturing industry is . . . ". Personal corpus creation program 122 divides the set of text X into individual words using morphological analysis. Personal corpus creation program 122 creates a word group W from the set of text X extracted. From the word group W, personal corpus creation program 122 extracts the basic word $DI_2$. The basic word $DI_2$ is not stored in basic corpus C therefore it is an unknown word. Personal corpus creation program 122 classifies the basic word $DI_2$ in an unknown word group NW. Personal corpus creation program 122 obtains a vector for each basic word in basic word group BW and then calculates the average vector $V_{BW}$ for all of the basic words in basic word group BW. Personal corpus creation program 122 registers the basic word $DI_2$ in the basic corpus C. By registering the basic word $DI_2$ in basic corpus C, the basic word $DI_2$ becomes a known word.

Figure 3D:
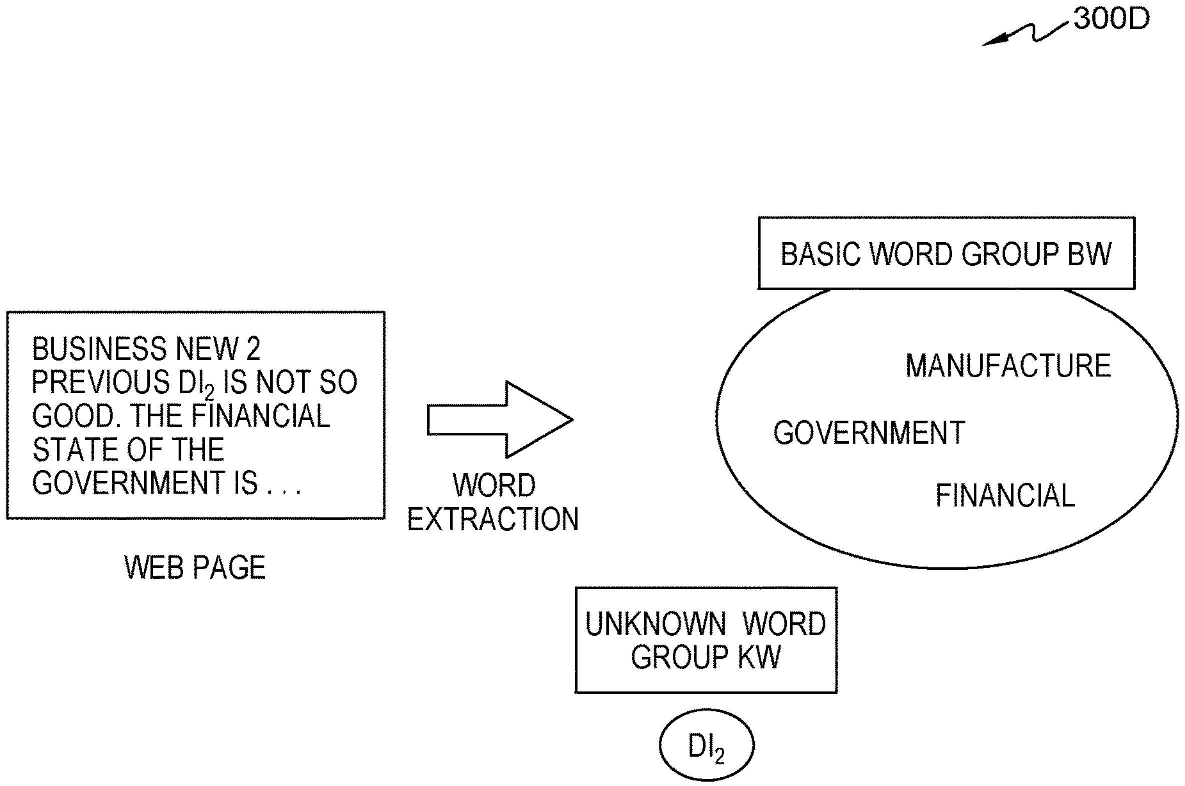
FIG. 3D is an exemplary diagram illustrating a processing of a known word of the word group W, on the server within the distributed data processing environment of FIG. 1, in accordance with an embodiment of the present invention.
Figure 3E:
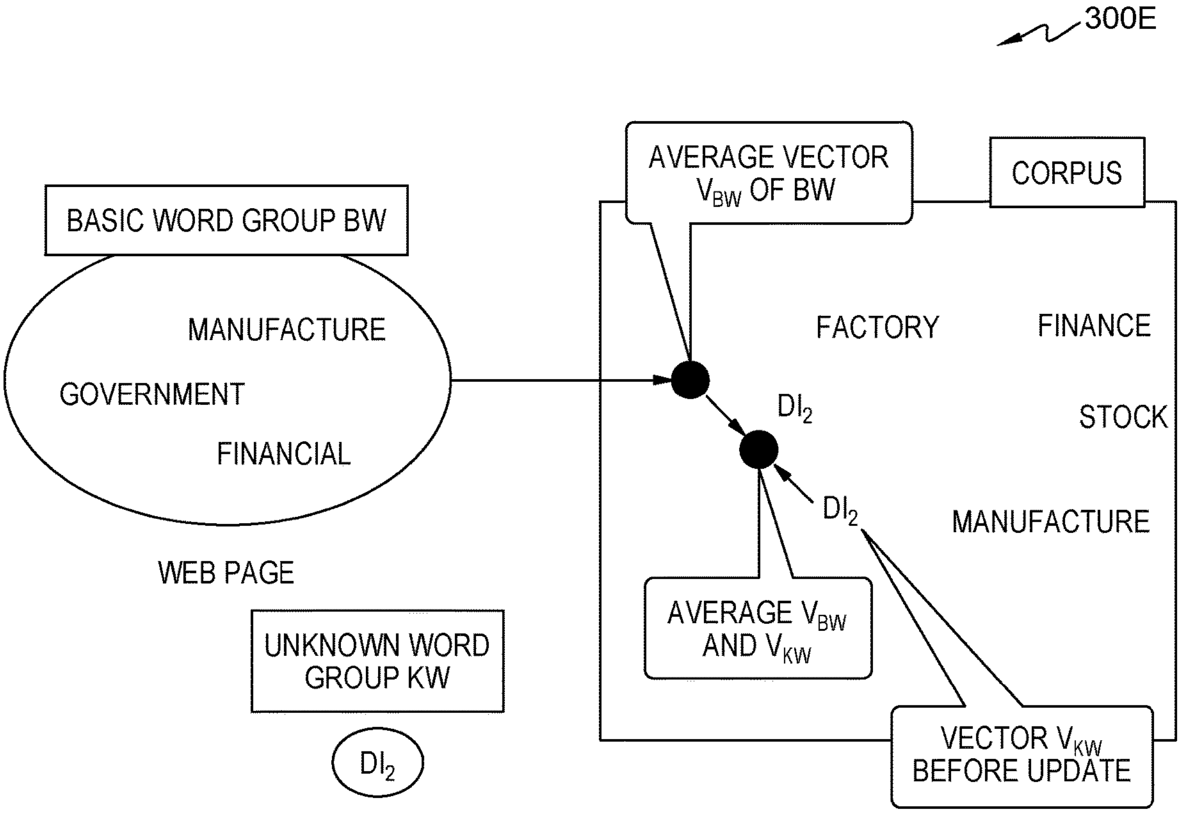
FIG. 3E is an exemplary diagram illustrating the processing of the known word of the word group W, on the server within the distributed data processing environment of FIG. 1, in accordance with an embodiment of the present invention.

FIG. 3D and FIG. 3E are exemplary diagrams, generally designated 300D and 300E, respectively, illustrating a processing of a known word of a word group W, on server 120 within distributed data processing environment 100 of FIG. 1, in accordance with an embodiment of the present invention. Personal corpus creation program 122 processes the known word $DI_2$ in known word group KW by determining the distance between the existing $V_{KW}$, which is the vector of the known word k stored in the basic corpus C, and $V_{BW}$, which is the average vector of the basic word group BW. Personal corpus creation program 122 determines whether the distance between the existing $V_{KW}$ and $V_{BW}$ exceeds a predetermined threshold $T_D$. Responsive to determining the distance between the existing $V_{KW}$ and $V_{BW}$ does not exceed the predetermined threshold $T_D$, personal corpus creation program 122 updates the vector of the known word $DI_2$ with $V_{KW}$.

Figure 3F:
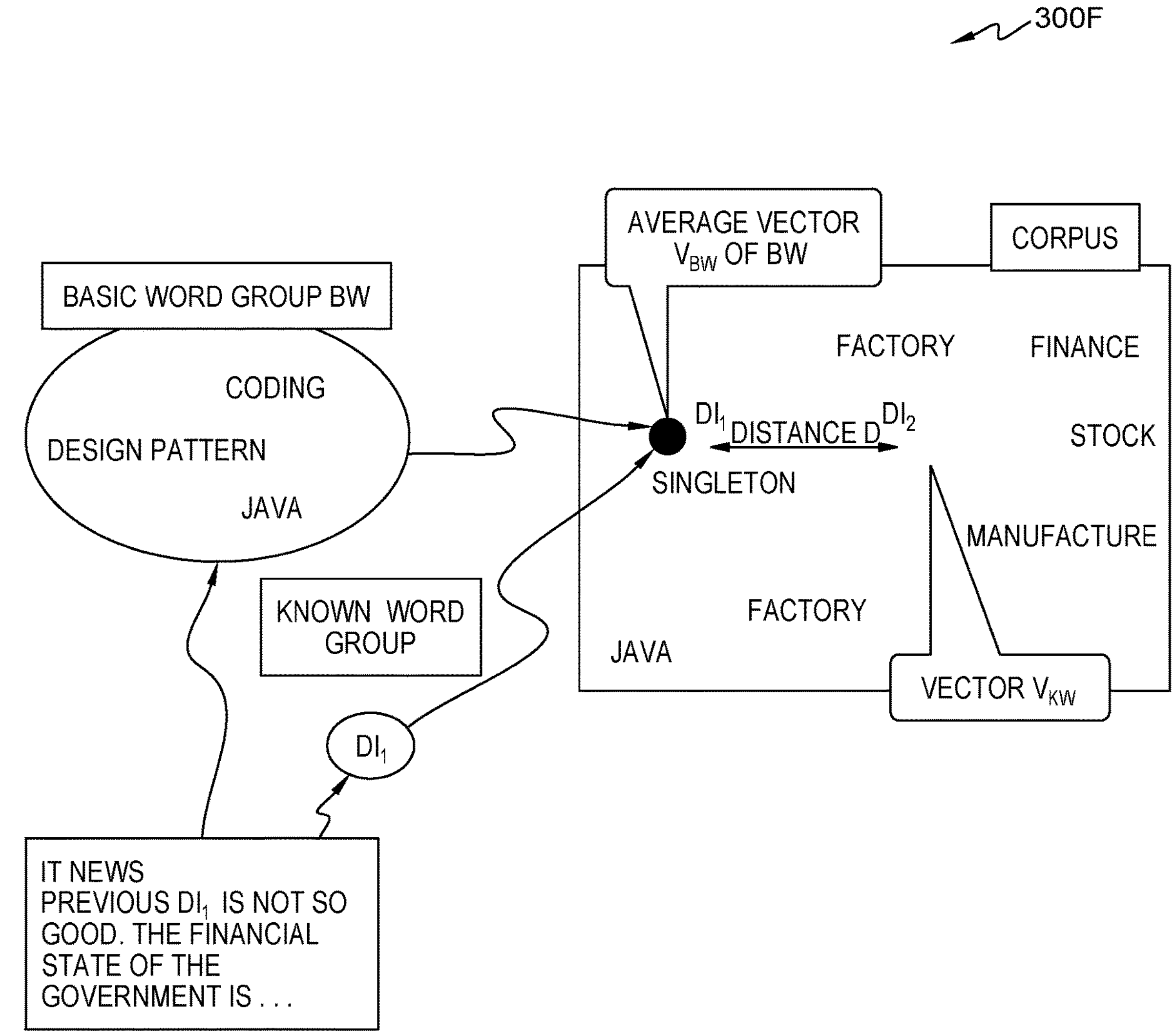
FIG. 3F is an exemplary diagram illustrating a processing of a polysemous word of the word group W, on the server within the distributed data processing environment of FIG. 1, in accordance with an embodiment of the present invention.
Figure 3G:
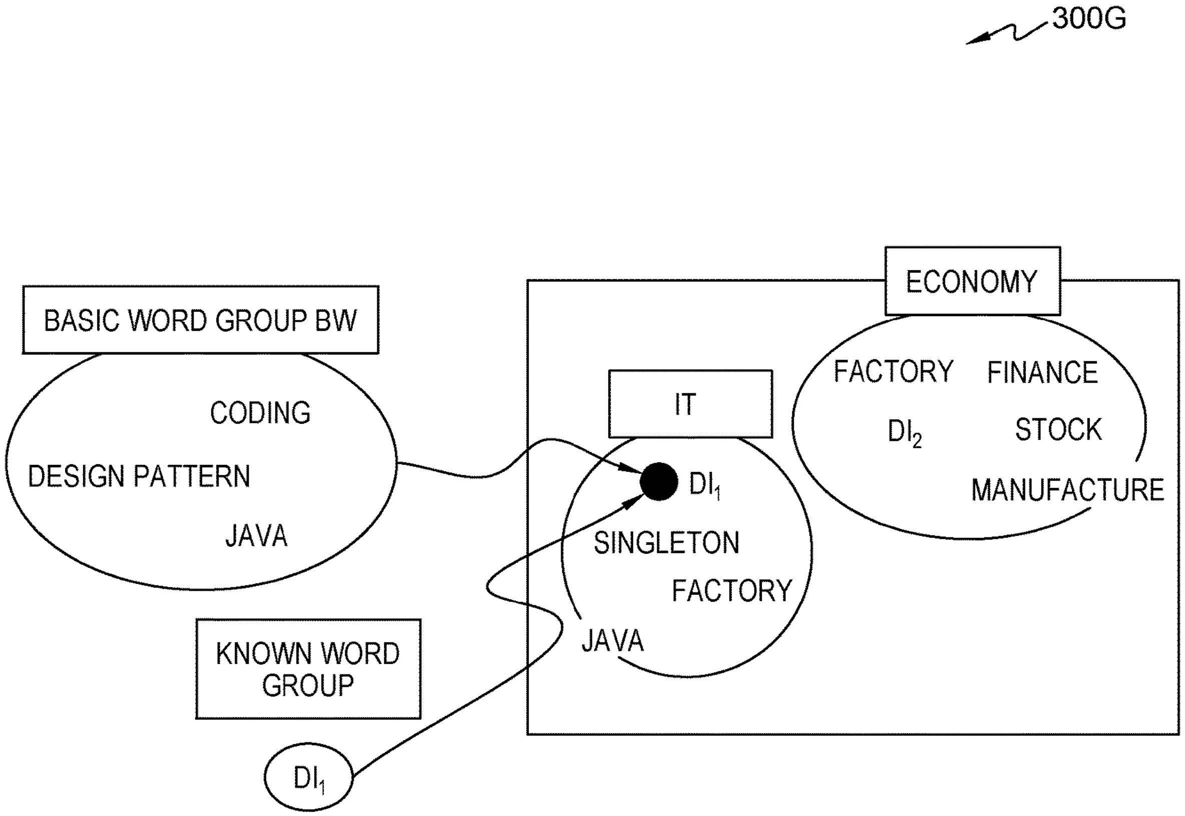
FIG. 3G is an exemplary diagram illustrating the processing of the polysemous word of the word group W, on the server within the distributed data processing environment of FIG. 1, in accordance with an embodiment of the present invention.

FIG. 3F and FIG. 3G are exemplary diagrams, generally designated 300F and 300G, respectively, illustrating a processing of a polysemous word of a word group W, on server 120 within distributed data processing environment 100 of FIG. 1, in accordance with an embodiment of the present invention. Personal corpus creation program 122 processes the known word $DI_1$ in known word group KW by determining the distance between the existing $V_{KW}$, which is the vector of the known word k stored in the basic corpus C, and $V_{BW}$, which is the average vector of the basic word group BW. Personal corpus creation program 122 determines whether the distance between the existing $V_{KW}$ and $V_{BW}$ exceeds a predetermined threshold $T_D$. Responsive to determining the distance between the existing $V_{KW}$ and $V_{BW}$ does exceed the predetermined threshold $T_D$, personal corpus creation program 122 registers the known word $DI_1$ in the personal corpus.

Figure 3H:
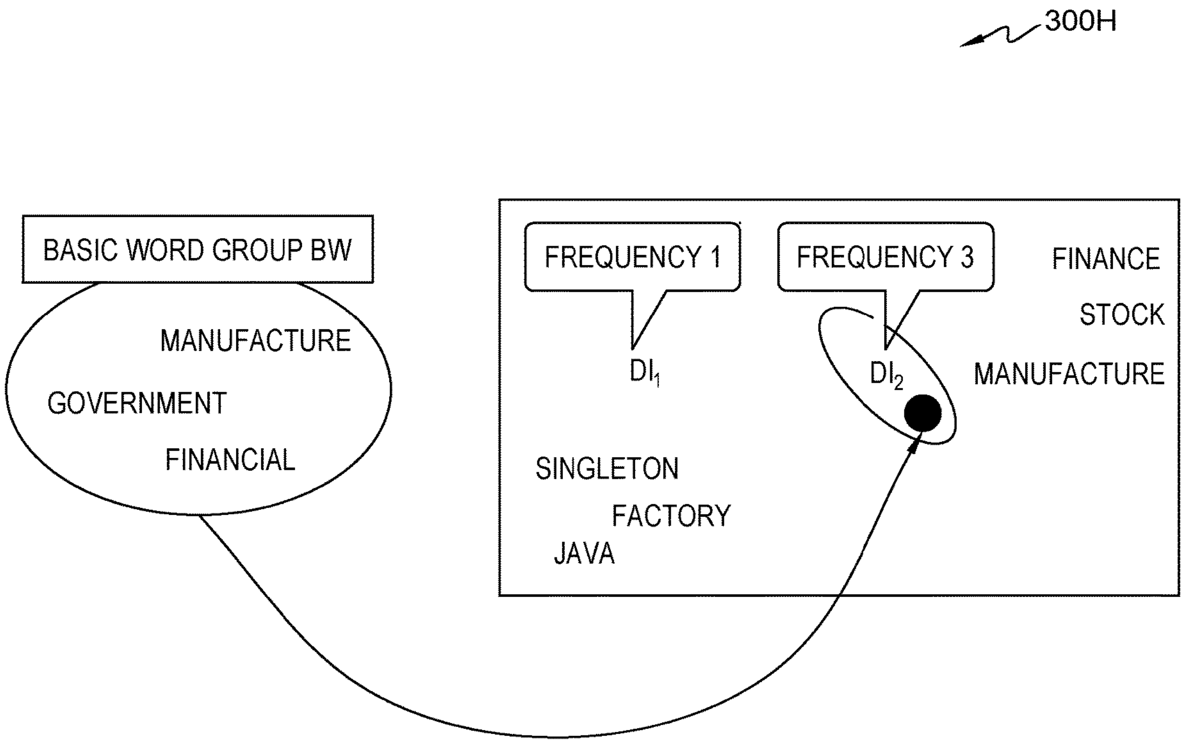
FIG. 3H is an exemplary diagram illustrating an update of a frequency f of the polysemous word selected among the polysemous words of the word group W, on the server within the distributed data processing environment of FIG. 1, in accordance with an embodiment of the present invention.
Figure 3I:
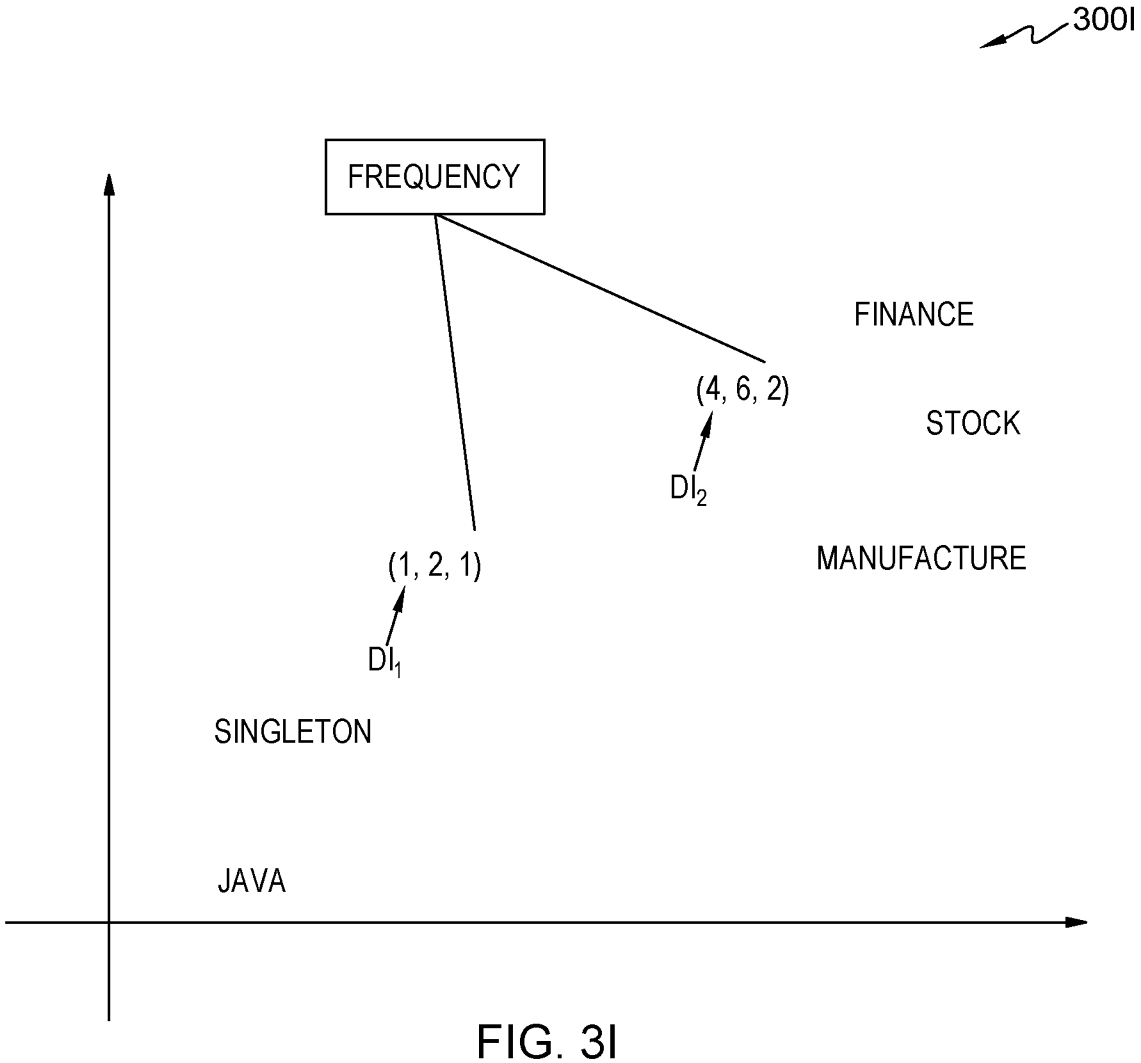
FIG. 3I is an exemplary diagram illustrating the update of the frequency f of the polysemous word selected among the polysemous words of the word group W, on the server within the distributed data processing environment of FIG. 1, in accordance with an embodiment of the present invention.

FIG. 3H and FIG. 3I are exemplary diagrams, generally designated 300H and 3001, respectively, illustrating an update of the frequency f of a polysemous word selected among the polysemous words of a word group W, on server 120 within distributed data processing environment 100 of FIG. 1, in accordance with an embodiment of the present invention. There are two polysemous words: $DI_1$ and $DI_2$. Therefore, personal corpus creation program 122 must subject the closest polysemous word to a calculation (i.e., a calculation of the distance between the existing $V_{KW}$ and $V_{BW}$ to determine whether the distance exceeds the predetermined threshold $T_D$).

FIG. 3J is an exemplary diagram, generally designated 300J, illustrating a relational database, on server 120 within distributed data processing environment 100 of FIG. 1, in accordance with an embodiment of the present invention. The relational database is a collective set of multiple data sets organized by columns. The relational database includes columns for a word, a vector associated with the word, an indication of whether an "is_general_word" flag is equal to true or false, a frequency f of the word among the polysemous words, a synonym ID, and a category into which the vector associated with the word has been clustered.

Figure 3K:
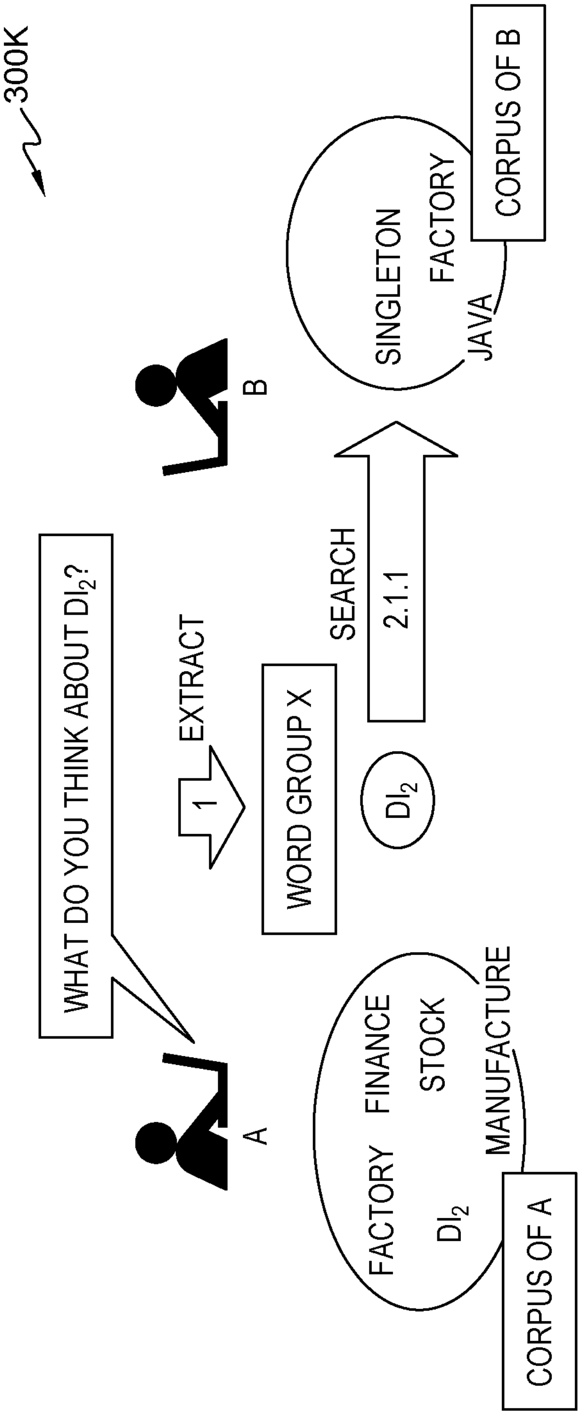
FIG. 3K is an exemplary diagram illustrating a first application of the personal corpus creation program, on the server within the distributed data processing environment of FIG. 1, in accordance with an embodiment of the present invention.
Figure 3L:
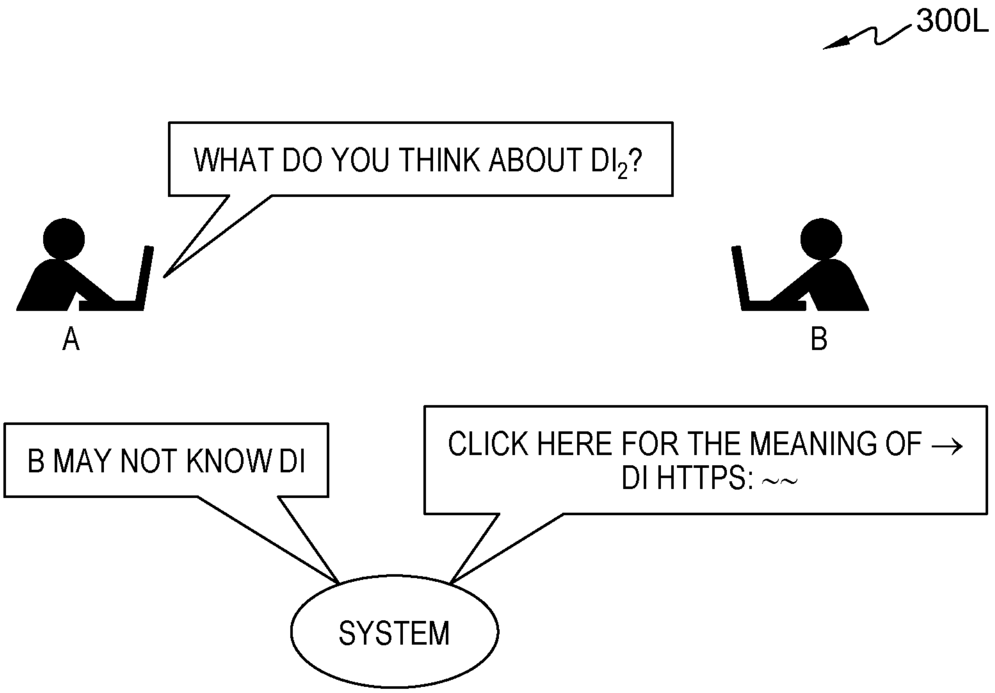
FIG. 3L is an exemplary diagram illustrating the first application of the personal corpus creation program, on the server within the distributed data processing environment of FIG. 1, in accordance with an embodiment of the present invention.

FIG. 3K and FIG. 3L are exemplary diagrams, generally designated 300K and 300L, respectively, illustrating a first application of personal corpus creation program 122, on server 120 within distributed data processing environment 100 of FIG. 1, in accordance with an embodiment of the present invention. In this first application shown in FIG. 3G, personal corpus creation program 122 obtains a group of words X other than basic terms from a message that a sender A is about to send in a chat room. Personal corpus creation program 122 searches for the word $x \in X$ from the corpus of a recipient B and does not find the word $x \in X$. Personal corpus creation program 122 defines the word $x \in X$ as an unknown word for the recipient B. Either personal corpus creation program 122 sends a notification that there is an unknown word for the sender A and recipient B or, alternatively, teaches recipient B the meaning of the unknown word (depending on the implementation).

Figure 3M:
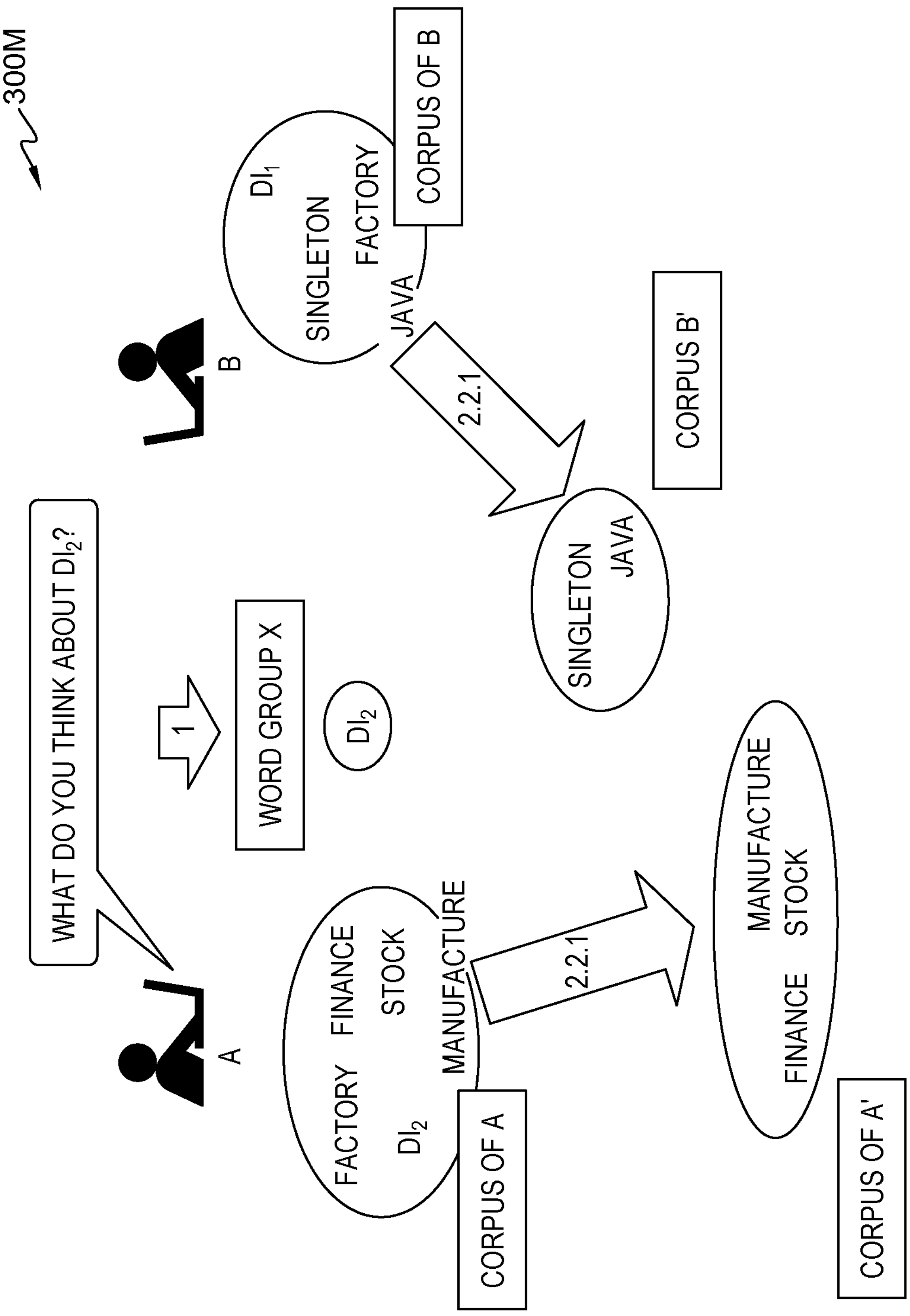
FIG. 3M is an exemplary diagram illustrating a second application of the personal corpus creation program, on the server within the distributed data processing environment of FIG. 1, in accordance with an embodiment of the present invention.
Figure 3N:
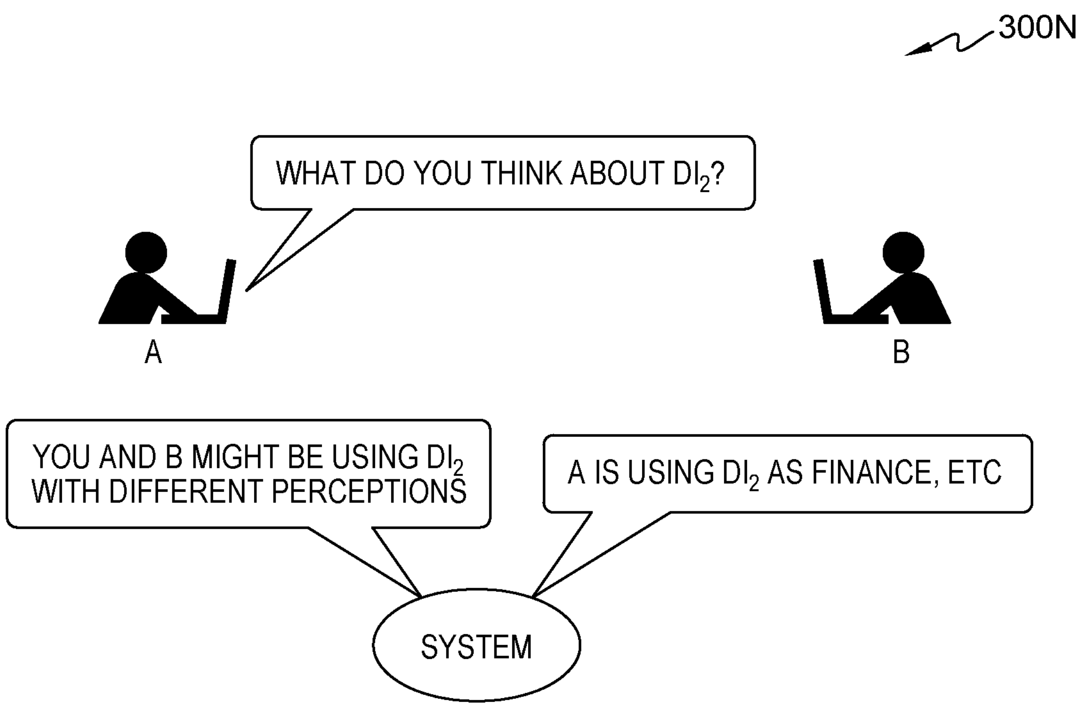
FIG. 3N is an exemplary diagram illustrating the second application of the personal corpus creation program, on the server within the distributed data processing environment of FIG. 1, in accordance with an embodiment of the present invention.

FIG. 3M and FIG. 3N are exemplary diagrams, generally designated 300M and 300N, respectively, illustrating a second application of personal corpus creation program 122, on server 120 within distributed data processing environment 100 of FIG. 1, in accordance with an embodiment of the present invention. In this first application shown in FIG. 3H, personal corpus creation program 122 obtains a group of words X other than basic terms from a message that a sender A is about to send in a chat room. Personal corpus creation program 122 searches for the word $x \in X$ from the corpus of a recipient B and does not find the word $x \in X$. Personal corpus creation program 122 extracts word groups whose vectors are close to the word x from the corpus of A and the corpus of B, respectively (corpora A' and B'). If there are multiple words with the same letter as x, personal corpus creation program 122 gives priority to the one with the greater frequency f. Personal corpus creation program 122 calculates the vectors of corpora A' and B' and compares the similarities. If the similarity is lower than a predefined threshold, personal corpus creation program 122 informs A and B about it. Personal corpus creation program 122 sends a notification to sender A alerting sender A that there is a difference in perception. Personal corpus creation program 122 sends a notification to recipient B alerting recipient B of the meaning the sender A is using.

In a third application of personal corpus creation program 122, personal corpus creation program 122 obtains a plurality of unique words other than the basic words from a second set of data sources associated with a first user. Among the plurality of unique words, personal corpus creation program 122 determines one or more common words are included in a second personal corpus of a second user. Personal corpus creation program 122 extracts a first word group and a second word group having a vector close to a common word of the one or more common words included in a first personal corpus of the first user and the second personal corpus of the second user, respectively. Responsive to the similarity between the first word group and the second word group not exceeding a predetermined threshold, personal corpus creation program 122 either sends a notification to the first user, or sends a word that has the vector close to the common word and is selected from a word group to the second user together with a set of textual information.

In a fourth application of personal corpus creation program 122, the corpus of a static page such as a blog at its creation (update) is embedded to record the meanings of words the author recognizes at that time. The entire corpus may be loaded using java script (JS), etc. (e.g., <script src="load-cupus-20190301.js/>"). If the corpus is hosted or version-managed, the link and version can be recorded as meta-information on the page (e.g., <meta name="corpus-link" content="//corpus.com/user1/"/> or <meta name="corpus-version" content="1.1.10"/>).

In a fifth application of personal corpus creation program 122, a particular word is found in a book that a user is reading but does not exist in the user's corpus. Personal corpus creation program 122 provides the user with the meaning of the word.

Figure 4:
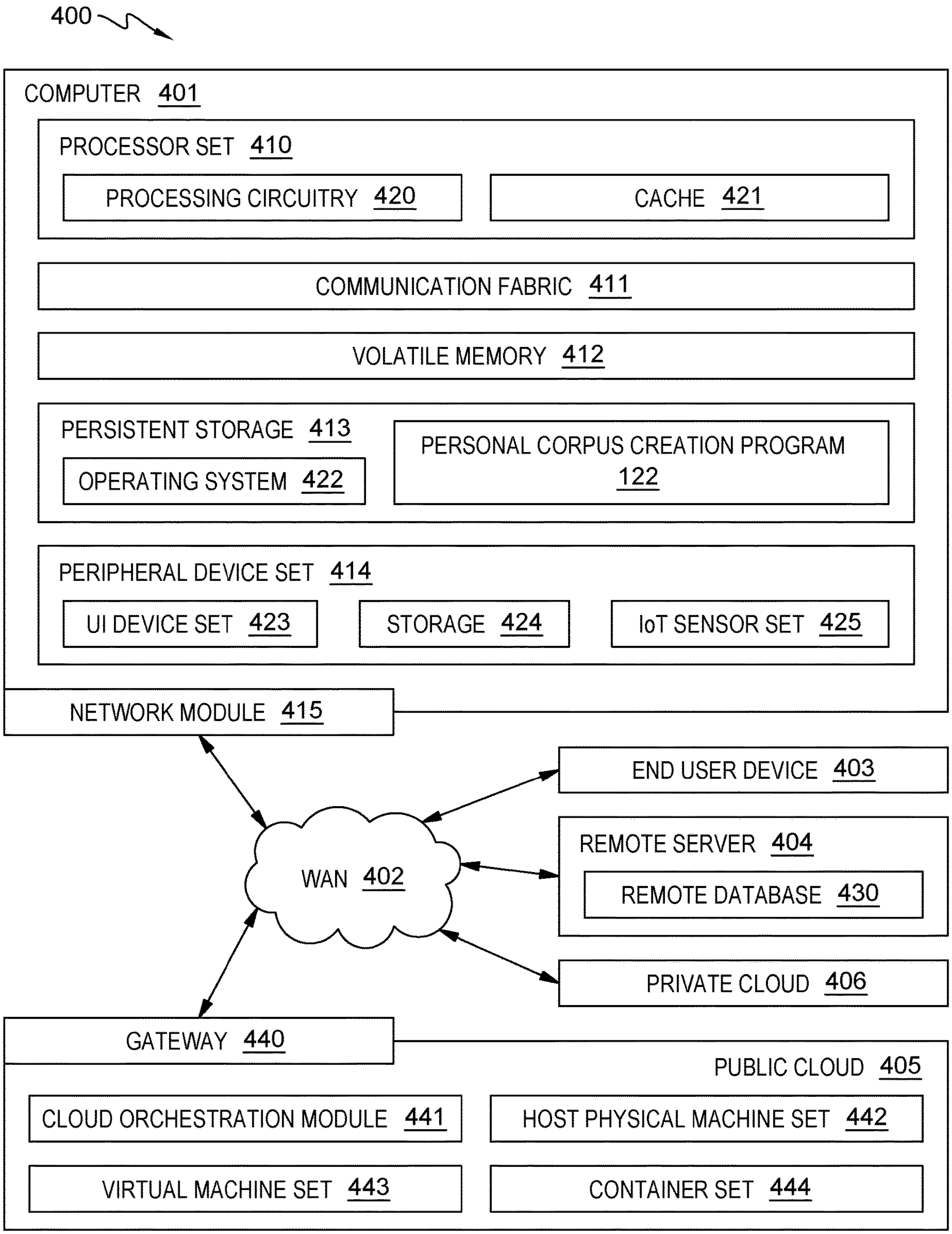
FIG. 4 is a block diagram illustrating components of a computing system for running the personal corpus creation program, in accordance with an embodiment of the present invention.

FIG. 4 depicts a block diagram of components of server 120 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Computing environment 400 contains an example of an environment for the execution of at least some of the computer code involved in performing the inventive methods, such as personal corpus creation program 122. In addition to personal corpus creation program 122, computing environment 400 includes, for example, computer 401, wide area network (WAN) 402, end user device (EUD) 403, remote server 404, public cloud 405, and private cloud 406. In this embodiment, computer 401 includes processor set 410 (including processing circuitry 420 and cache 421), communication fabric 411, volatile memory 412, persistent storage 413 (including operating system 422 and personal corpus creation program 122, as identified above), peripheral device set 414 (including user interface (UI), device set 423, storage 424, and Internet of Things (IoT) sensor set 425), and network module 415. Remote server 404 includes remote database 430. Public cloud 405 includes gateway 440, cloud orchestration module 441, host physical machine set 442, virtual machine set 443, and container set 444.

Computer 401, which represents server 120 of FIG. 1, may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 430. As is well understood in the art of computer technology, and depending upon the technology, performance of a computer-implemented method may be distributed among multiple computers and/or between multiple locations. On the other hand, in this presentation of computing environment 400, detailed discussion is focused on a single computer, specifically computer 401, to keep the presentation as simple as possible. Computer 401 may be located in a cloud, even though it is not shown in a cloud in FIG. 4. On the other hand, computer 401 is not required to be in a cloud except to any extent as may be affirmatively indicated.

Processor set 410 includes one, or more, computer processors of any type now known or to be developed in the future. Processing circuitry 420 may be distributed over multiple packages, for example, multiple, coordinated integrated circuit chips. Processing circuitry 420 may implement multiple processor threads and/or multiple processor cores. Cache 421 is memory that is located in the processor chip package(s) and is typically used for data or code that should be available for rapid access by the threads or cores running on processor set 410. Cache memories are typically organized into multiple levels depending upon relative proximity to the processing circuitry. Alternatively, some, or all, of the cache for the processor set may be located "off chip." In some computing environments, processor set 410 may be designed for working with qubits and performing quantum computing.

Computer readable program instructions are typically loaded onto computer 401 to cause a series of operational steps to be performed by processor set 410 of computer 401 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 421 and the other storage media discussed below. The program instructions, and associated data, are accessed by processor set 410 to control and direct performance of the inventive methods. In computing environment 400, at least some of the instructions for performing the inventive methods may be stored in personal corpus creation program 122 in persistent storage 413.

Communication fabric 411 is the signal conduction paths that allow the various components of computer 401 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 412 is any type of volatile memory now known or to be developed in the future. Examples include dynamic type random access memory (RAM) or static type RAM. Typically, the volatile memory is characterized by random access, but this is not required unless affirmatively indicated. In computer 401, the volatile memory 412 is located in a single package and is internal to computer 401, but, alternatively or additionally, the volatile memory may be distributed over multiple packages and/or located externally with respect to computer 401.

Persistent storage 413 is any form of non-volatile storage for computers that is now known or to be developed in the future. The non-volatility of this storage means that the stored data is maintained regardless of whether power is being supplied to computer 401 and/or directly to persistent storage 413. Persistent storage 413 may be a read only memory (ROM), but typically at least a portion of the persistent storage allows writing of data, deletion of data and re-writing of data. Some familiar forms of persistent storage include magnetic disks and solid-state storage devices. Operating system 422 may take several forms, such as various known proprietary operating systems or open-source Portable Operating System Interface type operating systems that employ a kernel. The code included in personal corpus creation program 122 typically includes at least some of the computer code involved in performing the inventive methods.

Peripheral device set 414 includes the set of peripheral devices of computer 401. Data communication connections between the peripheral devices and the other components of computer 401 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 423 may include components such as a display screen, speaker, microphone, wearable devices (such as goggles and smart watches), keyboard, mouse, printer, touchpad, game controllers, and haptic devices. Storage 424 is external storage, such as an external hard drive, or insertable storage, such as an SD card. Storage 424 may be persistent and/or volatile. In some embodiments, storage 424 may take the form of a quantum computing storage device for storing data in the form of qubits. In embodiments where computer 401 is required to have a large amount of storage (for example, where computer 401 locally stores and manages a large database) then this storage may be provided by peripheral storage devices designed for storing very large amounts of data, such as a storage area network (SAN) that is shared by multiple, geographically distributed computers. IoT sensor set 425 is made up of sensors that can be used in Internet of Things applications. For example, one sensor may be a thermometer and another sensor may be a motion detector.

Network module 415 is the collection of computer software, hardware, and firmware that allows computer 401 to communicate with other computers through WAN 402. Network module 415 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 415 are performed on the same physical hardware device. In other embodiments (for example, embodiments that utilize software-defined networking (SDN)), the control functions and the forwarding functions of network module 415 are performed on physically separate devices, such that the control functions manage several different network hardware devices. Computer readable program instructions for performing the inventive methods can typically be downloaded to computer 401 from an external computer or external storage device through a network adapter card or network interface included in network module 415.

WAN 402 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 403 is any computer system that is used and controlled by an end user (for example, a customer of an enterprise that operates computer 401) and may take any of the forms discussed above in connection with computer 401. EUD 403 typically receives helpful and useful data from the operations of computer 401. For example, in a hypothetical case where computer 401 is designed to provide a recommendation to an end user, this recommendation would typically be communicated from network module 415 of computer 401 through WAN 402 to EUD 403. In this way, EUD 403 can display, or otherwise present, the recommendation to an end user. In some embodiments, EUD 403 may be a client device, such as thin client, heavy client, mainframe computer, desktop computer and so on.

Remote server 404 is any computer system that serves at least some data and/or functionality to computer 401. Remote server 404 may be controlled and used by the same entity that operates computer 401. Remote server 404 represents the machine(s) that collect and store helpful and useful data for use by other computers, such as computer 401. For example, in a hypothetical case where computer 401 is designed and programmed to provide a recommendation based on historical data, then this historical data may be provided to computer 401 from remote database 430 of remote server 404.

Public cloud 405 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 405 is performed by the computer hardware and/or software of cloud orchestration module 441. The computing resources provided by public cloud 405 are typically implemented by virtual computing environments that run on various computers making up the computers of host physical machine set 442, which is the universe of physical computers in and/or available to public cloud 405. The virtual computing environments (VCEs) typically take the form of virtual machines from virtual machine set 443 and/or containers from container set 444. It is understood that these VCEs may be stored as images and may be transferred among and between the various physical machine hosts, either as images or after instantiation of the VCE. Cloud orchestration module 441 manages the transfer and storage of images, deploys new instantiations of VCEs and manages active instantiations of VCE deployments. Gateway 440 is the collection of computer software, hardware, and firmware that allows public cloud 405 to communicate through WAN 402.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 406 is similar to public cloud 405, except that the computing resources are only available for use by a single enterprise. While private cloud 406 is depicted as being in communication with WAN 402, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 405 and private cloud 406 are both part of a larger hybrid cloud.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The foregoing descriptions of the various embodiments of the present invention have been presented for purposes of illustration and example but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:

creating, by one or more processors, a basic corpus for a first user using a first set of data sources, wherein the basic corpus includes one or more basic words and one or more vectors of the one or more basic words;

extracting, by the one or more processors, a set of text from a second set of data sources associated with the first user;

responsive to finding an unknown word included in the set of text extracted, updating, by the one or more processors, the basic corpus, wherein the basic corpus is updated by replacing a vector of the unknown word with an average vector of the one or more basic words in the basic corpus created and registering the unknown word in a first personal corpus;

responsive to finding a known word included in the set of text extracted, determining, by the one or more processors, a distance between a vector of the known word and the average vector of the one or more basic words in order to register the known word in the first personal corpus;

responsive to determining the distance does exceed a first threshold, registering, by the one or more processors, the known word in the first personal corpus as a polysemous word; and responsive to determining the distance does not exceed the first threshold, updating, by the one or more processors, the vector of the known word by replacing the vector of the known word with an average of the vector of the known word and the average vector for the one or more basic words.

2. The computer-implemented method of claim 1, wherein creating the basic corpus for the first user using the first set of data sources further comprises:

tagging, by the one or more processors, each basic word of the one or more basic words with a flag.

3. The computer-implemented method of claim 1, wherein creating the basic corpus for the first user using the first set of data sources further comprises:

separating, by the one or more processors, a first basic word from the basic corpus if the basic word is polysemous; and clustering, by the one or more processors, the first basic word with a second basic word based on a degree of similarity.

4. The computer-implemented method of claim 1, wherein the second set of data sources includes at least one of a group of historical information acquired from a user computing device of the first user and a group of information input into the user computing device by the first user.

5. The computer-implemented method of claim 4, wherein the group of historical information acquired from the user computing device of the first user and the group of information input into the user computing device by the first user includes at least one of a web browsing history of the user computing device, an email history of the user computing device, a chat history of the user computing device, and a text message history of the user computing device.

6. The computer-implemented method of claim 1, wherein extracting the set of text from the second set of data sources associated with the first user further comprises:

dividing, by the one or more processors, the set of text into one or more words using morphological analysis; and creating, by the one or more processors, a first word group from the set of text.

7. The computer-implemented method of claim 6, further comprising:

subsequent to extracting the set of text from the second set of data sources associated with the first user, processing, by the one or more processors, the unknown word from the first word group created; and processing, by the one or more processors, the known word from the first word group created.

8. The computer-implemented method of claim 7, wherein processing the unknown word from the first word group created further comprises:

extracting, by the one or more processors, a third basic word from the first word group created;

classifying, by the one or more processors, the third basic word into a basic word group; and calculating, by the one or more processors, the average vector for the basic word group.

9. The computer-implemented method of claim 1, further comprising:

obtaining, by the one or more processors, a plurality of unique words other than the one or more basic words from the second set of data sources associated with the first user;

determining, by the one or more processors, among the plurality of unique words, one or more common words are included in a second personal corpus of the second user;

extracting, by the one or more processors, a second word group and a third word group having a vector close to a common word of the one or more common words included in the first personal corpus of the first user and the second personal corpus of the second user, respectively; and responsive to a similarity between the second word group and the third word group not exceeding a second threshold:

sending, by the one or more processors, a notification to the first user, or sending, by the one or more processors, a word that has the vector close to the common word and is selected from the first word group to the second user together with a set of textual information.

10. A computer program product comprising:

one or more computer readable storage media and program instructions stored on the one or more computer readable storage media, the program instructions comprising:

program instructions to create a basic corpus for a first user using a first set of data sources, wherein the basic corpus includes one or more basic words and one or more vectors of the one or more basic words;

program instructions to extract a set of text from a second set of data sources associated with the first user;

responsive to finding an unknown word included in the set of text extracted, program instructions to update the basic corpus, wherein the basic corpus is updated by replacing a vector of the unknown word with an average vector of the one or more basic words in the basic corpus created and registering the unknown word in a first personal corpus;

responsive to finding a known word included in the set of text extracted, program instructions to determine a distance between a vector of the known word and the average vector of the one or more basic words in order to register the known word in the first personal corpus;

responsive to determining the distance does exceed a first threshold, program instructions to register the known word in the first personal corpus as a polysemous word; and responsive to determining the distance does not exceed the first threshold, program instructions to update the vector of the known word by replacing the vector of the known word with an average of the vector of the known word and the average vector for the one or more basic words.

11. The computer program product of claim 10, wherein extracting the set of text from the second set of data sources associated with the first user further comprises:

program instructions to divide the set of text into one or more words using morphological analysis; and program instructions to create a first word group from the set of text.

12. The computer program product of claim 11, further comprising:

subsequent to extracting the set of text from the second set of data sources associated with the first user, program instructions to process the unknown word from the first word group created; and program instructions to process the known word from the first word group created.

13. The computer program product of claim 12, wherein processing the unknown word from the first word group created further comprises:

program instructions to extract a third basic word from the first word group created;

program instructions to classify the third basic word into a basic word group; and program instructions to calculate the average vector for the basic word group.

14. A computer system comprising:

one or more computer processors;

one or more computer readable storage media;

program instructions collectively stored on the one or more computer readable storage media for execution by at least one of the one or more computer processors, the stored program instructions comprising:

program instructions to create a basic corpus for a first user using a first set of data sources, wherein the basic corpus includes one or more basic words and one or more vectors of the one or more basic words;

program instructions to extract a set of text from a second set of data sources associated with the first user;

responsive to finding an unknown word included in the set of text extracted, program instructions to update the basic corpus, wherein the basic corpus is updated by replacing a vector of the unknown word with an average vector of the one or more basic words in the basic corpus created and registering the unknown word in a first personal corpus;

responsive to finding a known word included in the set of text extracted, program instructions to determine a distance between a vector of the known word and the average vector for of the one or more basic words in order to register the known word in the first personal corpus;

responsive to determining the distance does exceed a first threshold, program instructions to register the known word in the first personal corpus as a polysemous word; and responsive to determining the distance does not exceed the first threshold, program instructions to update the vector of the known word by replacing the vector of the known word with an average of the vector of the known word and the average vector for the one or more basic words.

15. The computer system of claim 14, wherein extracting the set of text from the second set of data sources associated with the first user further comprises:

program instructions to divide the set of text into one or more words using morphological analysis; and program instructions to create a first word group from the set of text.

16. The computer system of claim 15, further comprising:

subsequent to extracting the set of text from the second set of data sources associated with the first user, program instructions to process the unknown word from the first word group created; and program instructions to process the known word from the first word group created.

17. The computer system of claim 16, wherein processing the unknown word from the first word group created further comprises:

program instructions to extract a third basic word from the first word group created;

program instructions to classify the third basic word into a basic word group; and program instructions to calculate the average vector for the basic word group.

* * * * *